(12) United States Patent
Scag et al.

(10) Patent No.: US 6,341,479 B1
(45) Date of Patent: Jan. 29, 2002

(54) HYDROSTATIC DRIVE WALK-BEHIND LAWN MOWER

(75) Inventors: Dane T. Scag, Elm Grove, WI (US); Mark C. Bland, New Albany, IN (US)

(73) Assignee: Great Dane Power Equipment, Inc., Elm Grove, WI (US)

( * ) Notice: Subject to any disclaimer, the term of this patent is extended or adjusted under 35 U.S.C. 154(b) by 0 days.

(21) Appl. No.: 09/598,672

(22) Filed: Jun. 20, 2000

Related U.S. Application Data (60) Provisional application No. 60/145,415, filed on Jul. 23, 1999.

(51) Int. Cl.[7] .......................... A01D 34/68; A01D 69/00
(52) U.S. Cl. ........................................................ 56/11.3
(58) Field of Search ................................. 56/10.1, 11.2, 56/11.3, 11.4, 10.8, 10.9, 11.1, 13.5, 14.7, 16.7, DIG. 6, DIG. 15; 180/6.48, 19.3, 19.1, 308, 333

(56) References Cited

U.S. PATENT DOCUMENTS

| | | | |
|---|---|---|---|
| 4,879,867 A | 11/1989 | Wenzel | |
| 4,920,733 A | 5/1990 | Berrios | |
| 4,920,734 A | 5/1990 | Wenzel | |
| 4,967,543 A | 11/1990 | Scag et al. | |
| 4,991,382 A | 2/1991 | Scag | |
| 5,020,308 A | 6/1991 | Braun et al. | |
| 5,077,959 A | * 1/1992 | Wenzel | 56/11.1 |
| 5,651,241 A | 7/1997 | Wegner | |
| 5,809,756 A | 9/1998 | Scag et al. | |
| 5,848,520 A | * 12/1998 | Arfstrom et al. | 56/11.4 |
| 5,894,714 A | * 4/1999 | Braun et al. | 56/11.4 |
| 6,098,385 A | * 8/2000 | Turk | 56/11.3 |
| 6,155,033 A | * 12/2000 | Wians et al. | 56/11.1 |

* cited by examiner

*Primary Examiner*—Robert E. Pezzuto
(74) *Attorney, Agent, or Firm*—William K. Baxter; Godfrey & Kahn, S.C.

(57) ABSTRACT

A self-propelled lawn mower having a hydrostatic drive system with individual brake control levers coupled to a linkage mechanism which when actuated releases hydraulic pressure in the hydrostatic drive system to slow rotation of rear drive wheels for improved steering and control of the lawn mower. The lawn mower includes a mower deck, a mower deck, and a control console extending between handle bars attached to the rear of the mower deck. The drive system comprises an infinitely variable speed control from forward, neutral, and reverse. Steering is accomplished by two independent wheel brakes, which are controlled by right and left hand brake control levers located adjacent respective handgrip levers. Squeezing one of the brake control levers partially releases the internal hydraulic pressure by the opening of a dump valve to effectively produce a reduced transmission drive condition. Squeezing both of the brake control levers simultaneously and completely, fully opens the dump valve, removing all hydraulic pressure from the drive system. This transmission drive condition permits easy steering in turns, along with positive braking action.

25 Claims, 6 Drawing Sheets

FIG_1

FIG_2

FIG_3

FIG_7

HYDROSTATIC DRIVE WALK-BEHIND LAWN MOWER

CROSS-REFERENCE TO RELATED APPLICATION

This application claims the benefit of U.S. Provisional Application Ser. No. 60/145,415, filed July 23, 1999.

BACKGROUND OF THE INVENTION

The present invention relates generally to lawn mowers, and more particularly to improvements in the drive, steering and controls for a self-propelled, walk-behind commercial type lawn mower having a hydrostatic drive system.

Conventional commercial type, walk-behind lawn mowers typically include a number of levers and linkages for controlling operation of the mower. During routine operation, these mowers must often be maneuvered around trees, shrubs, flower gardens and other obstacles quickly and with precision. Because these mowers typically weigh several hundred pounds, they are often equipped with self-propelling drive systems for driving drive wheels on the mowers. These drive systems typically include a mechanism for transferring power from an engine to at least two drive wheels for assisting the operator in propelling and maneuvering the machine.

Generally, there are two common types of drive systems for driving self-propelled, walk-behind lawn mowers. The first type of system is a mechanical belt drive system. A lawn mower with this type of drive system has an engine for driving a mechanical transmission connected to a belt drive to power the drive wheels. These mowers typically include a direct drive, nondifferential type axle. In these mowers, each wheel is belt driven and is provided with a clutch and individual brakes.

In addition to powering the drive wheels, these mowers also employ belt drives for powering the cutting blades under the mower deck. The engine typically has a vertical output shaft with at least two pulleys. A first pulley is coupled by a belt to a pulley on the transmission to supply power to the drive wheels. A second pulley is connected by a belt to the blade drive system of the mower deck. This pulley has an associated clutch so that the operator can control power to the cutting blades.

This type of drive system has the advantage of being low cost, but the disadvantage of requiring the shifting of gears to change the forward travel speed, or to change from forward to neutral to reverse. A lawn mower with this type of drive system usually needs to be stopped before shifting gears. This is inefficient and time consuming. Another problem with a belt drive system is that the belts tend to slip when the grass is wet, resulting in the drive wheels losing traction. The belts also tend to wear out quickly.

The second type of drive system is a hydraulic or hydrostatic drive system. Hydrostatic drive systems are known to exhibit desirable characteristics such as allowing an operator to quickly switch from forward, neutral and reverse modes of operation. In this type of drive system, a variable displacement hydraulic pump is coupled to a hydraulic motor for driving a differential transmission connected to at least two drive wheels. While with this system there are no mechanical drive belts to the rear drive wheels to slip and wear out, the disadvantage of this type of drive system is the initial high cost and complexity of maintenance.

Within hydraulic systems in general, there are several major types. In order to provide the utmost in maneuverability, one type of hydraulically driven lawn mower included two different pumps, each connected to a separate wheel motor, and each controlled by a separate lever. While this type of mower is extremely maneuverable, it is also more complex and expensive than would be desirable many lawn mower service companies. In order to reduce the cost of hydraulically driven mowers, it has been proposed to use only one pump and one motor, connected to the two drive wheels through a differential. In previous mowers of this latter type, however, two critical problems have arisen, making the mower rather difficult to control. First, the effect of the differential during braking is to transfer all of the power to the unbraked wheel up to twice the wheel speed experienced when the brakes are not applied. In other words, when the braked wheel is stopped, the unbraked drive wheel rotates up to twice the speed of the braked drive wheel, effectively resulting in a speed increase while turning the lawn mower. Secondly, the hydraulic transmission is still trying to drive both drive wheels, including the wheel to which the brakes are applied. This results in a dangerous tendency for the mower to try to continue to move forward. This requires a forceful operator to not let the mower move out of control. If the operator can anticipate the need to stop and brake, the operator must shift the mower into neutral, a tricky maneuver while trying to control the forward motion of the mower.

The present invention is an improvement on the second type of drive system, at a cost comparable to the first type. There is a need for a low cost, self-propelled, walk-behind lawn mower having a hydrostatic drive system which is easier to turn, maneuver and control than prior art lawn mowers.

SUMMARY OF THE INVENTION

Therefore, objects of the invention include providing 1) a self-propelled, walk-behind lawn mower which overcomes the drawbacks of the prior art; 2) a self-propelled, walk-behind lawn mower employing a hydrostatic drive system with a differential transmission to power rear drive wheels; 3) a low-cost hydrostatic drive lawn mower with improved maneuverability and control; and 4) a hydrostatic drive walk-behind lawn mower that is less complex and less expensive than prior art lawn mowers.

The present invention is a self-propelled, walk-behind lawn mower having a hydrostatic drive system with individual brake assemblies coupled to a linkage mechanism which when actuated releases hydraulic pressure in the hydrostatic drive system to slow rotation of rear drive wheels for improved steering and control of the lawn mower. The mower includes a mower deck having a front portion supported by a pair of front caster wheels and a rear portion supported by a pair of rear drive wheels. A plurality of cutting blade assemblies are mounted within the mower deck. The lawn mower further includes an engine supported on the rear portion of the mower deck for driving the rear drive wheels and the cutting blade assemblies, and a handle bar assembly extending rearwardly and upwardly from the rear portion of the mower deck for controlling operation of the mower.

The hydrostatic drive system comprises a single variable displacement hydraulic pump coupled to a single fixed displacement hydraulic motor coupled to a differential transmission to drive the rear drive wheels. The hydrostatic drive system is located underneath the mower deck between the rear drive wheels.

Each drive wheel is fitted with an independent brake assembly which is engaged by means of a brake control lever on the handle bar assembly. Squeezing a selected brake control lever to engage one of the brake assemblies actuates the linkage mechanism coupled to the hydraulic transmission to reduce the speed of the drive wheels while turning or stopping the mower.

The linkage mechanism located between the brake assemblies is coupled to a hydraulic dump valve on the hydraulic pump. The hydraulic pump is in turn coupled to the hydraulic motor and differential transmission. Applying one of the brakes, partially releases hydraulic pressure by opening the dump valve to effectively produce a reduced transmission drive condition which slows rotation of the drive wheels and allows an operator to easily turn the mower. When both brakes are applied, the dump valve is fully opened, releasing all of the hydraulic pressure from the pump to slow and stop rotation of the drive wheels.

As mentioned previously, individual brake assemblies are attached to each rear drive wheel for slowing rotation of the drive wheels. The linkage mechanism is situated between the right and left brake assemblies and is coupled to the hydraulic transmission located underneath the mower deck. The linkage mechanism operates to reduce hydraulic pressure in the transmission by actuating the dump valve on the hydraulic pump to slow rotation of the drive wheels when one or both of the brake assemblies are actuated. The brake assemblies are actuated by an operator squeezing the respective brake control levers on the handle bar assembly.

Various other features, objects, and advantages of the invention will be made apparent to those skilled in the art from the accompanying drawings and detailed description thereof.

DESCRIPTION OF THE PREFERRED EMBODIMENTS

The present invention is directed to a self-propelled, walk-behind lawn mower having a hydrostatic drive system with individual brake control levers coupled to a linkage mechanism which when actuated releases hydraulic pressure in the hydrostatic drive system to slow rotation of rear drive wheels for improved steering and control of the lawn mower.

Figure 1:
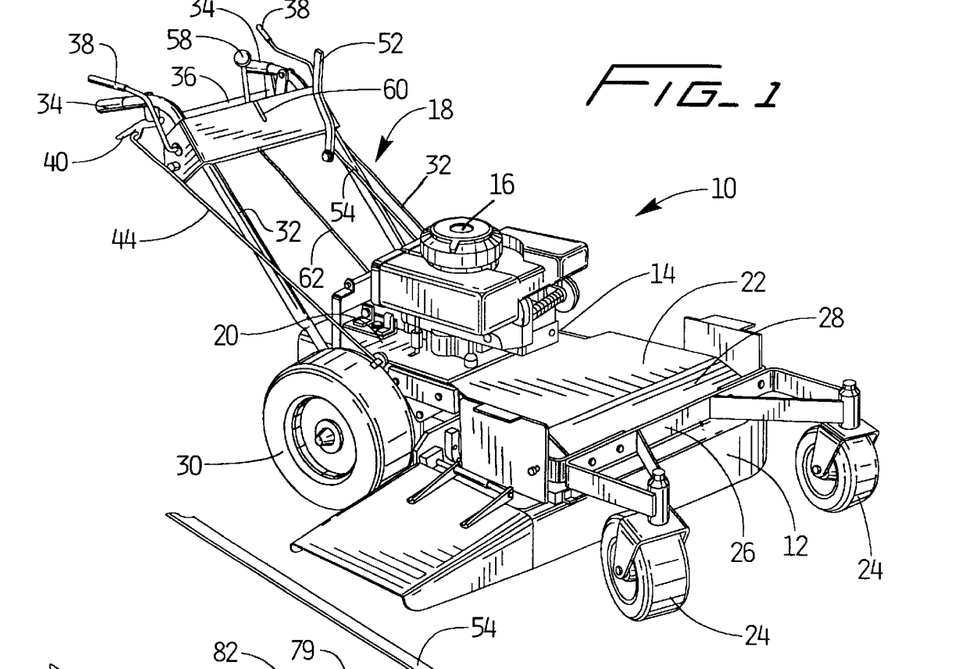
FIG. 1 is a perspective view of a self-propelled, walk-behind lawn mower constructed in accordance with the present invention.

Referring now to the drawings, FIG. 1 shows a lawn mower 10 constructed in accordance with a preferred embodiment of the present invention. The lawn mower 10 includes a rigid frame 12 with a mower deck 14 supporting an engine 16, and a handle bar assembly 18 attached to and extending rearwardly and upwardly from a rear section 20 of the mower deck 14 for controlling operation of the mower.

Mounted below the mower deck 14 is a plurality of cutting blades which rotate in a horizontal plane on vertical shafts coupled to the engine 16 by a belt drive assembly located under a cover 22 on top of the mower deck 14, such as shown in U.S. Pat. Nos. 4,991,382 and 5,809,756 to Scag, the disclosures of which are incorporated herein by reference. A pair of ground engaging front caster wheels 24 support a front section 28 of the mower deck 14. In the embodiment shown, the caster wheels 24 are mounted forward of the mower deck 14 by a rigid framework 26 attached to the front section 28 of the mower deck.

The rear section 20 of the mower deck 14 is supported by right and left rear drive wheels 30 for propelling the mower forward or in reverse. The engine 16 supported by the mower deck 14 is preferably a gasoline powered internal combustion engine for powering the plurality of cutting blades housed within the mower deck 14 and the at least two rear drive wheels 30. The engine 16 powers the rear drive wheels 30 through a hydrostatic drive system. The engine 16 is coupled to the hydrostatic drive system through a belt drive assembly located underneath the engine 16 and mower deck 14. The hydrostatic drive system comprises a single variable displacement hydraulic pump and a single fixed displacement hydraulic motor for driving a differential transmission to drive the rear drive wheels 30. The hydrostatic drive system is located underneath the rear section 20 of the mower deck 14 between the rear drive wheels 30.

The handle bar assembly 18 extending rearwardly and upwardly from the rear section 20 of the mower deck 14 is provided for maneuvering and controlling the mower 10. The handle bar assembly 18 includes a pair of handle bar support tubes 32 which are mounted to and extend from the rear section 20 of the mower deck in generally parallel, spaced-apart relation. Attached to each upper end of the handle bar support tubes 32 are respective right and left handgrips 34 to be grasped by the operator during operation.

Figure 7:
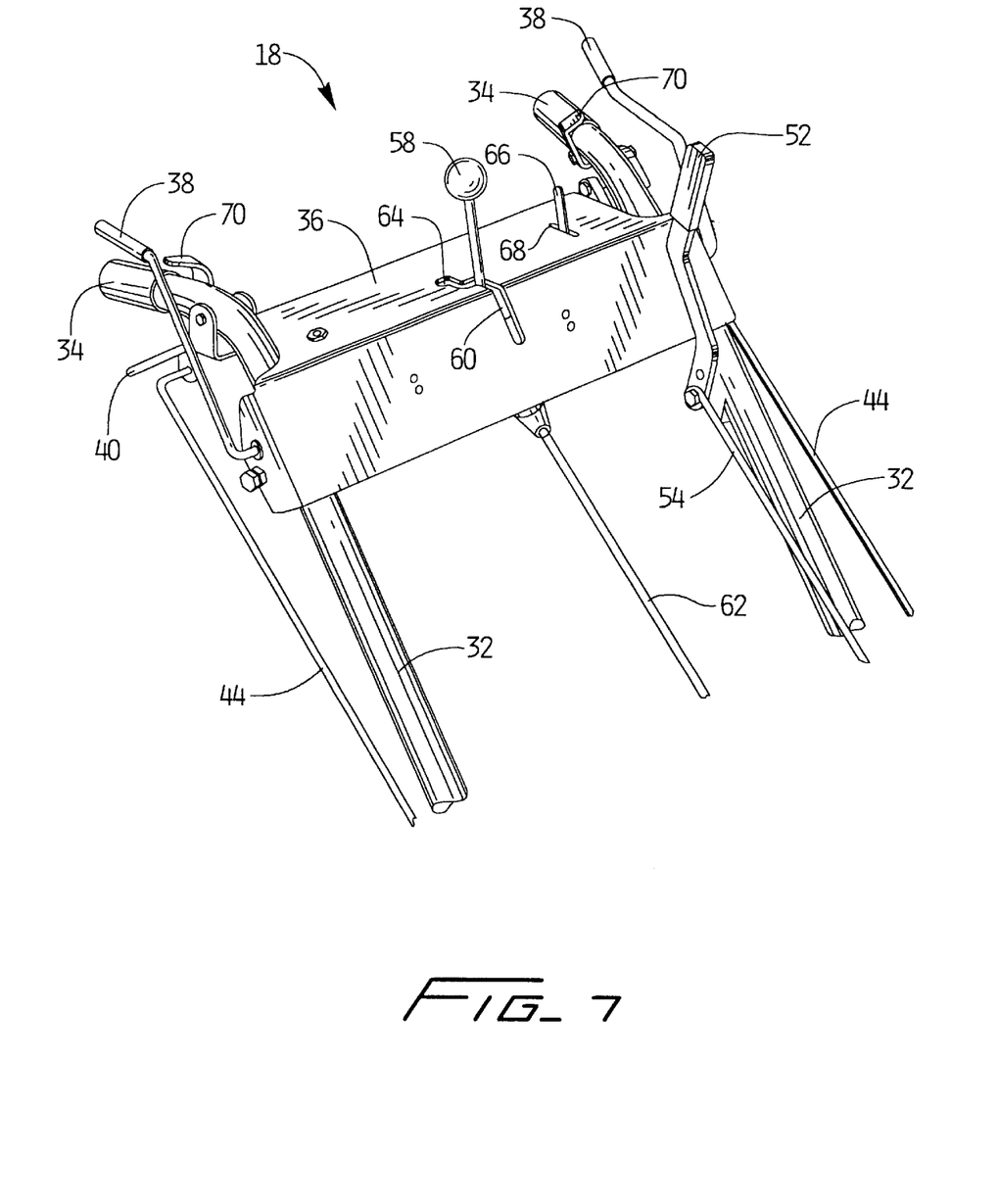
FIG. 7 is a perspective view of a control console for controlling the lawn mower.

As seen in FIGS. 1 and 7, an operator control panel 36 is rigidly affixed to and extends between handle bar support tubes 32 near the upper ends of the tubes, just before the handgrips 34. In a most preferred embodiment, a pair of safety interlock levers 38 extend outwardly and upwardly from each side of the control panel 36. The safety interlock levers 38 are positioned above each handgrip 34, so that an operator may easily grasp the handgrips 34 and safety interlock levers 38 when operating the mower. The safety interlock levers 38 are used for disabling the engine 16 when the operator releases his hands from the handgrips 34 and the safety interlock levers 38.

The handle bar assembly 18 further includes a pair of brake control levers 40 located underneath each handgrip 34 for actuating brake assemblies 42 on each drive wheel 30. Each drive wheel 30 is fitted with an independent brake assembly 42 which is engaged by brake control levers 40 on the handle bar assembly 18. Squeezing a selected brake control lever 40 actuates the respective brake assembly 42. The brake assemblies 42 are actuated by squeezing the respective brake control levers 40 in an upward direction toward the handgrips 34. A brake control rod 44 extends from each brake control lever 40 down to a corresponding brake actuating bell crank 46. While the invention includes any suitable method of braking, the most preferred type of braking is a band brake, in which the squeezing of the brake control lever results in a band being tightened around a respective wheel shaft, thereby slowing the rotation of the wheel.

As explained in more detail below, the brake control levers 40 also actuate a linkage mechanism 48 coupled to the hydraulic transmission 50 to reduce the speed of the drive wheels 30 while turning or stopping the mower.

Extending upwardly on one side of the control panel 36 is a blade control lever 52 for controlling the engagement/disengagement of the cutting blades. A blade control rod 54 attached to the end of the blade control lever 52 extends downwardly therefrom to a clutch assembly 56 on the mower deck 14 for engaging and disengaging the cutting blades. The clutch assembly 56 engages the engine 16 to drive the belts coupled to the mower deck belt drive assembly.

The propulsion of the mower is controlled by a speed and direction control lever 58. An operator can control the speed and forward/reverse direction of the rear drive wheels 30 through the use of this single operating control lever 58. The speed and direction control lever 58 is pivotably mounted to the control panel 36, and extends through a non-linear elongated slot 60 in the control panel 36 for shifting between forward, neutral and reverse modes of operation. The speed and direction control lever 58 connects to a speed and direction control rod 62 extending downwardly therefrom to the hydraulic transmission 50. The control lever 58 is pushed forward, from a neutral position, to cause the mower to move forward. The forward speed increases as the control lever 58 is pushed further forward. The control lever 58 may also be pulled back from a forward position to neutral, and even further back to reverse to cause the mower to move in a reverse direction. In a preferred embodiment, the backward motion of the control lever 58 is spring loaded to cause the lever 58 to move back to neutral when an operator's hand is removed from the control lever 58. There is a notch 64 in the slot 60 so that the control lever 58 may be held in reverse. In addition, an engine choke/throttle control 66 extends upwardly through a slot 68 in the control panel 36 to control the engine throttle.

Also mounted on the handle bar assembly 18 located above each handgrip 34 are lockable brake control thumb latches 70 to latch the brake control levers 40 in an actuated position for stopping or parking the mower. The latches 70 are actuated by the operator rotating the latches with his/her thumbs to lock each of the brake control levers 40 in an actuated position.

A unique feature of the present invention is providing a linkage mechanism 48 between the brake assemblies 42 to actuate a hydraulic dump valve on the hydraulic pump to release hydraulic pressure from the transmission. Application of the brakes causes the linkage mechanism 48 to partially dump hydraulic pressure from the hydraulic pump, thereby slowing rotation of the drive wheels 30 and producing a smooth, controlled lower speed turn.

Thus, steering control of the mower is accomplished by the two independent brake assemblies 42 which are controlled by right and left brake control levers 40 located adjacent the handgrips 34. Squeezing one of the brake control levers 40 partially releases hydraulic pressure by the opening a dump valve on the hydraulic pump to effectively produce a reduced transmission drive condition. This reduced transmission drive condition slows rotation of the drive wheels 30 allowing for easier turning of the mower.

Figure 2:
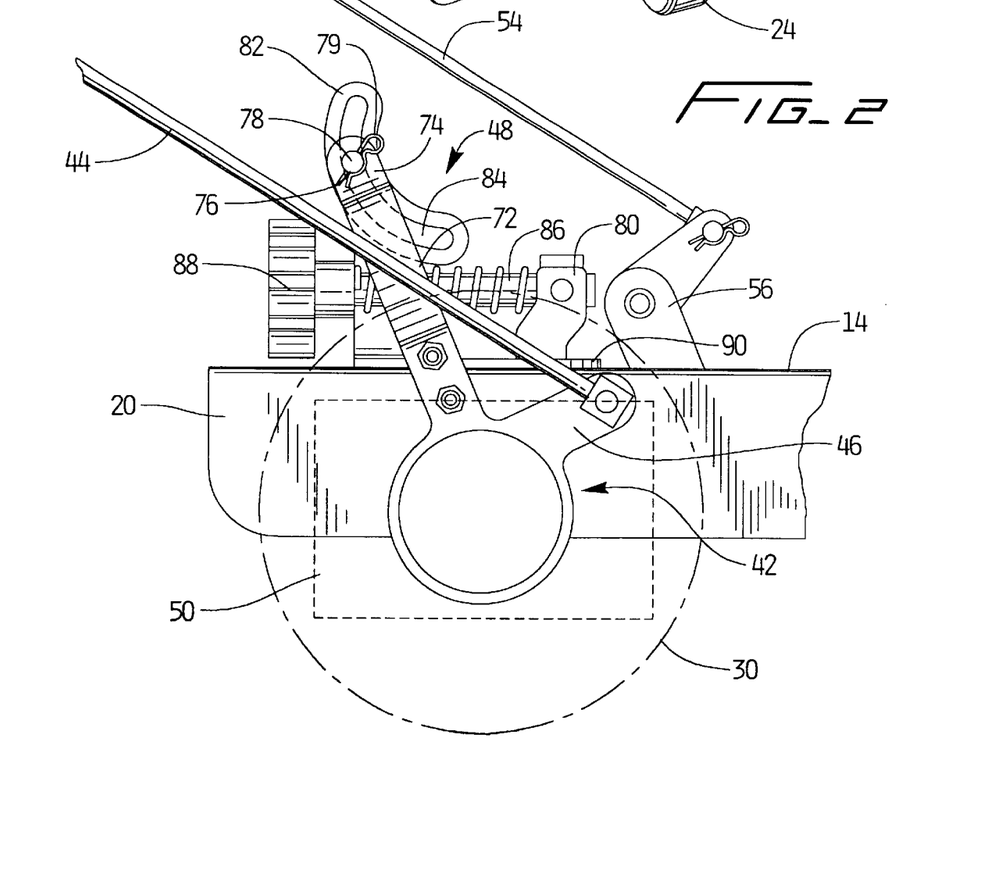
FIG. 2 is a side elevational view of a rear section of the lawn mower of FIG. 1, showing a mechanism for braking and steering the lawn mower.

Referring next to FIG. 2, the rear section 20 of the mower deck 14 is shown illustrating a brake assembly 42 coupled to a dump valve linkage mechanism 48 for controlling the hydrostatic drive system of the mower. As mentioned previously, individual brake assemblies 42 are attached to each rear drive wheel 30 for slowing rotation of the drive wheels. The linkage mechanism 48 is situated between the right and left brake assemblies 42 and is coupled to the hydraulic transmission 50 located underneath the mower deck 14. The linkage mechanism 48 operates to reduce hydraulic pressure in the transmission 50 by actuating a dump valve on the hydraulic pump to slow rotation of the drive wheels 30 when one or both of the brake assemblies 42 are actuated.

The brake assemblies 42 are actuated by an operator squeezing the respective brake control lever 40. The brake control lever 40 actuates the brake control rod 44 by pulling it upwardly and rearwardly thereby applying the brake to the respective rear drive wheel 30 and actuating the dump valve linkage mechanism 48. Each brake assembly 42 includes a brake actuating bell crank 46 and a brake lever bell crank 72. Each brake lever bell crank 72 extends upwardly and rearwardly from the brake actuating bell crank 46. A rod support portion 74 extends from the end of each of the brake lever bell cranks 72. The rod support portions 74 each include an aperture 76 for accepting a dump valve actuating rod 78. The dump valve actuating rod 78 is inserted through the apertures 76 in each of the rod support portions 74. The rod 78 is preferably held in place between the right and left brake lever bell cranks 72 by a fastener 79 on each end of the rod 78 extending through the apertures 76.

In addition to the brake lever bell cranks 72 and the dump valve actuating rod 78 fastened between them, the linkage mechanism 48 further includes a dump valve actuating mechanism 80. The dump valve actuating mechanism includes a dump valve actuating cam 82 with a curved slot 84 extending therethrough. The curved profile of the slot 84 accelerates the dump valve displacement when actuated. The dump valve actuating rod 78 is inserted through the curved slot 76 in the dump valve actuating cam 82. The dump valve actuating cam 82 is further connected to a dump valve adjustment member 86. The dump valve adjustment member 86 is connected to a dump valve actuating link 90, which in turn is pivotally connected to a dump valve actuating arm 92, which extends through a curved slot 94 in the top surface of the rear section 20 of the mower deck. The end of dump valve actuating arm 92 extending through the curved slot 94 is coupled to a dump valve on the hydraulic pump (not shown). The dump valve actuating arm 92 rotates about a pivot point 96 on the dump valve actuating link 90 to manipulate the dump valve. The dump valve adjustment member 86 includes an adjustment knob 88 on one end thereof for fine adjustment of the linkage mechanism 48 coupled to the dump valve.

Referring next to FIGS. 3–6, the rear section 20 of the mower deck is shown. The linkage mechanism 48 through application of the brakes manipulates hydraulic pressure from the hydraulic pump to the hydraulic motor. Applying one of the brakes partially releases hydraulic pressure by opening a dump valve to effectively produce a reduced transmission drive condition which slows rotation of the drive wheels 30 and allows an operator to easily turn the mower.

Figure 3:
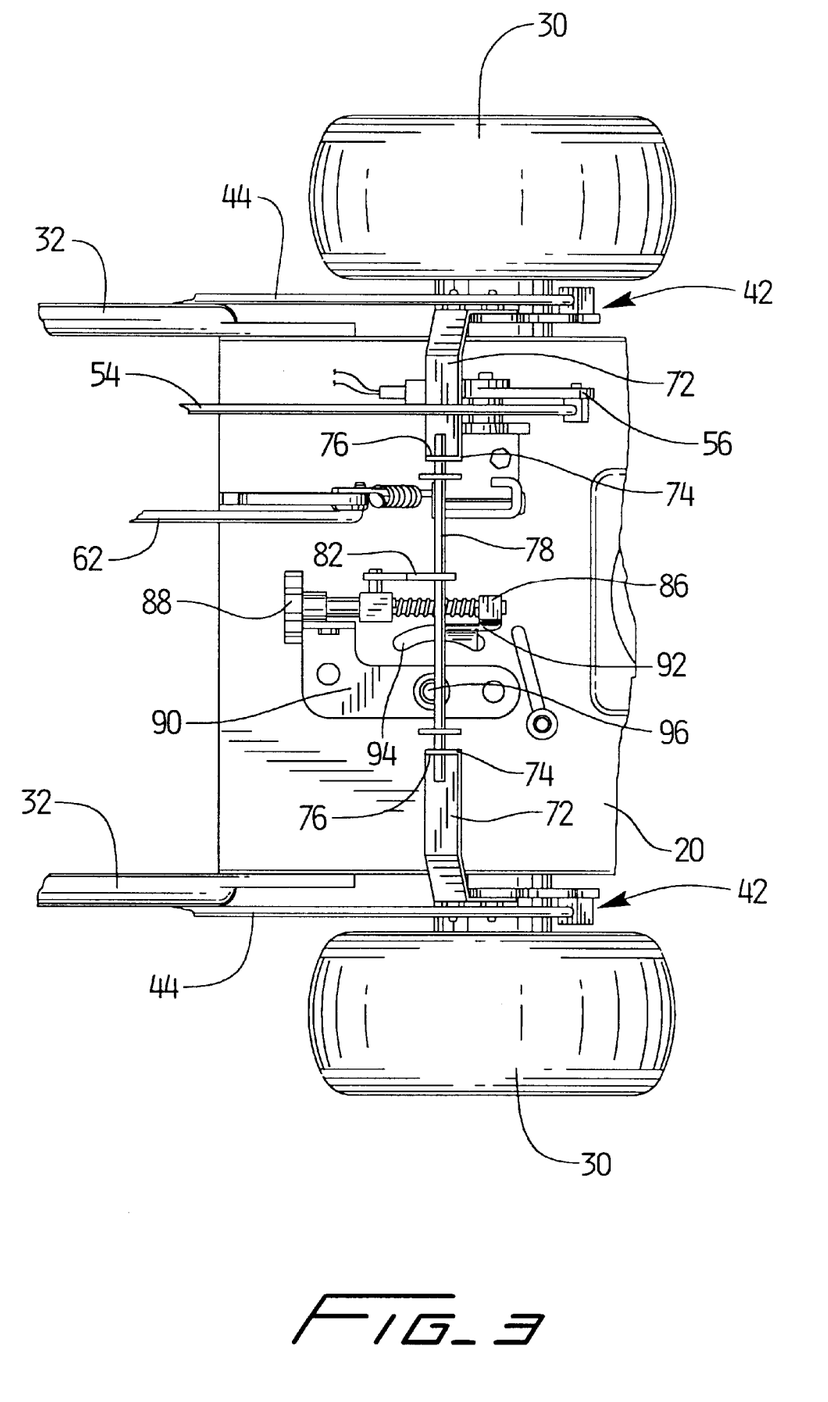
FIG. 3 is a top plan view of the rear of the lawn mower showing right and left brakes not applied to right and left drive wheels.

FIG. 3 illustrates the normal operating condition of the mower. Neither brake control lever 40 is actuated (the brakes are not applied), the dump valve is closed, and the drive wheels are operating at a normal forward or reverse speed.

Figure 4:
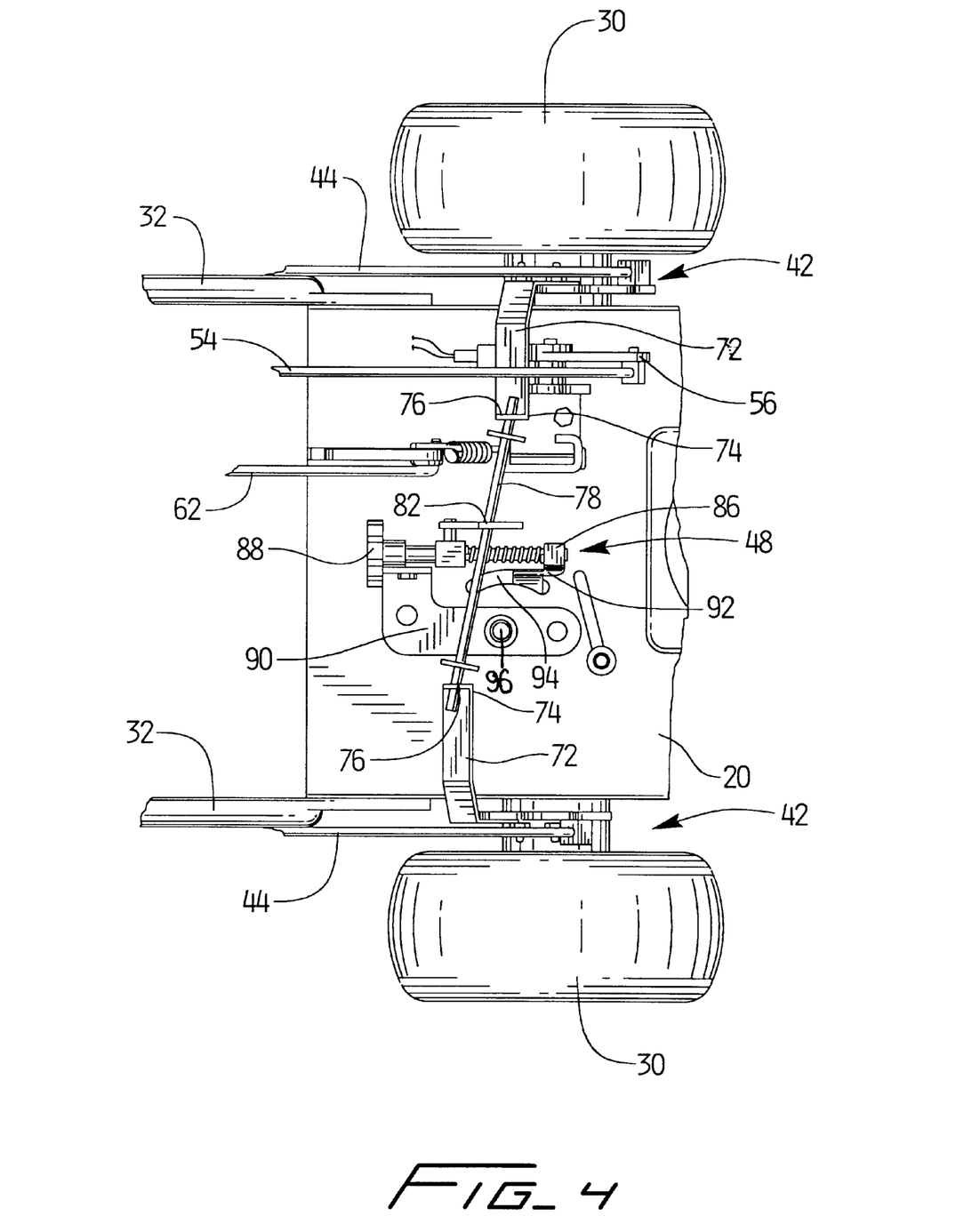
FIG. 4 is a top plan view of the rear of the lawn mower showing the right brake applied to the right drive wheel.

FIG. 4 shows the mower in a right turning condition with the right brake control lever 40 actuated and the right brake applied to the right drive wheel 30. Squeezing of the right brake control lever 40 actuates the right brake control rod 44 by pulling it upwardly and rearwardly and thereby applying the brake to the right rear drive wheel 30 and partially actuating the dump valve linkage mechanism 48. Actuation of the right brake control rod 44 rotates the right brake lever bell crank 72 rearwardly toward the rear of the mower. The right side of the dump valve actuating rod 78 is pulled back by the right brake lever bell crank 72 to actuate the dump valve actuating arm 92 coupled to the dump valve actuating cam 82. The dump valve actuating arm 92 partially opens the dump valve to release some of the hydraulic pressure from the hydraulic pump. This release of hydraulic pressure from the hydraulic pump causes the hydraulic motor in the transmission 50 to slow rotation of the drive wheels 30 so that the operator may more easily turn the mower to the right.

Figure 5:
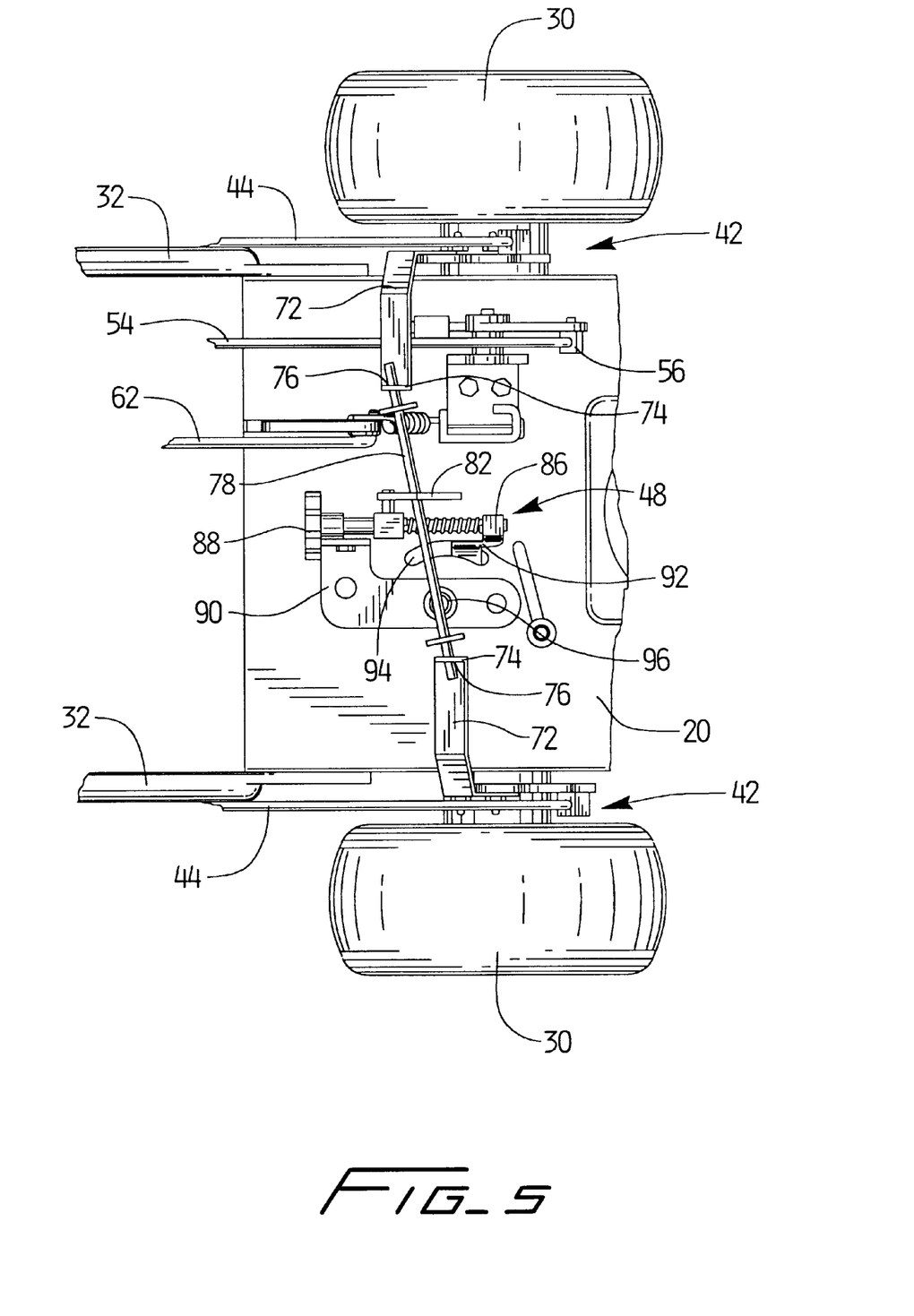
FIG. 5 is a top plan view of the rear of the lawn mower showing the left brake applied to the left drive wheel.

FIG. 5 shows the mower in a left turning condition. In this case, the left brake control lever 40 is actuated and the right brake is applied to the left drive wheel 30. Squeezing of the left brake control lever 40 actuates the left brake control rod 44 by pulling it upwardly and rearwardly and thereby applying the brake to the left rear drive wheel 30 and partially actuating the dump valve linkage mechanism 48. Actuation of the left brake control rod 44 rotates the left brake lever bell crank 72 rearwardly toward the rear of the mower. The left side of the dump valve actuating rod 78 is pulled back by the left brake lever bell crank 72 to actuate the dump valve actuating arm 92 coupled to the dump valve actuating cam 82. The dump valve actuating arm 92 partially opens the dump valve to release some of the hydraulic pressure from the hydraulic pump. This release of hydraulic pressure from the hydraulic pump causes the hydraulic motor in the transmission 50 to slow rotation of the drive wheels 30 so that the operator may more easily turn the mower to the left.

Figure 6:
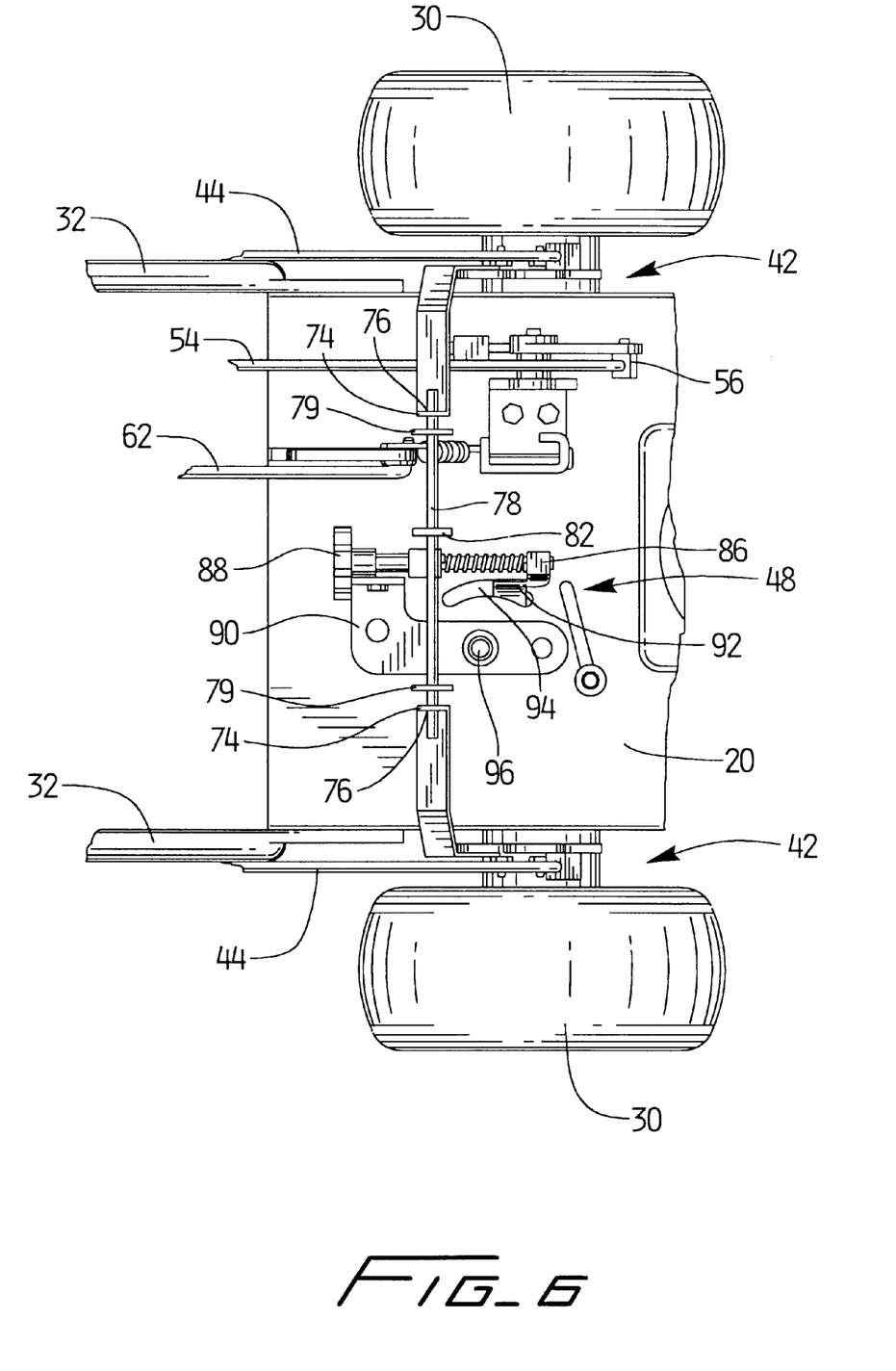
FIG. 6 is a top plan view of the rear of the lawn mower showing the right and left brakes applied to the right and left drive wheels.

FIG. 6 shows the mower in a slowing or stopped condition with both the right and left brakes applied to the right and left drive wheels 30. When both brake control levers 40 are actuated, the dump valve is fully opened, releasing all of the hydraulic pressure in the hydraulic pump. The brakes are then totally effective with no tendency for the mower to move. Squeezing the right and left brake control levers 40 actuates the right and left brake control rods 44 by pulling them upwardly and rearwardly and thereby applying the brakes to both drive wheels 30 and fully actuating the dump valve linkage mechanism 48. Actuation of the brake control rods 44 rotates the brake lever bell cranks 72 rearwardly toward the rear of the mower. Both sides of the dump valve actuating rod 78 are pulled back by the brake lever bell cranks 72 actuating the dump valve actuating arm 92 coupled to the dump valve actuating cam 82. The dump valve actuating arm 92 fully opens the dump valve to release all the hydraulic pressure from the hydraulic pump. This release of hydraulic pressure from the hydraulic pump causes the hydraulic motor in the transmission 50 to slow and stop rotation of the drive wheels 30.

While the invention has been described with reference to preferred embodiments, those skilled in the art will appreciate that certain substitutions, alterations, and omissions may be made without departing from the spirit of the invention. Accordingly, the foregoing description is meant to be exemplary only and should not limit the scope of the invention set forth in the following claims.

What is claimed is:

1. A lawn mower comprising:
   a mower deck supporting an engine and having a pair of rear drive wheels mounted thereto;
   a handle bar assembly attached to and extending rearwardly and upwardly from the mower deck for controlling operation of the mower;
   an independent brake assembly mounted to each rear drive wheel for selectively braking the rear drive wheels, each brake assembly is coupled to a brake control lever attached to the handle bar assembly for individually actuating each brake assembly;
   a hydrostatic drive system coupled between the engine and the rear drive wheels for powering the rear drive wheels, wherein the hydrostatic drive system includes a variable hydraulic pump coupled to a fixed displacement hydraulic motor which is coupled to a differential transmission for driving the rear drive wheels; and
   a linkage mechanism coupled to the brake assemblies and the hydrostatic drive system for releasing hydraulic pressure from the hydrostatic drive system after actuation of at least one of the brake assemblies by the brake control levers to slow rotation of the drive wheels, wherein the linkage mechanism includes a dump valve actuating mechanism coupled to a hydraulic dump valve connected to the hydraulic pump which is actuated by the brake control levers to slow rotation of the rear drive wheels by releasing hydraulic pressure in the hydraulic pump coupled to the hydraulic motor and differential transmission for improved steering and control of the mower.

2. The lawn mower of claim 1 wherein the mower deck includes a front section housing with a plurality of cutting blades mounted therein and supported by at least one caster wheel, and a rear section supported by the pair of rear drive wheels.

3. The lawn mower of claim 2 wherein the handle bar assembly includes a pair of handle bar support tubes, each tube having a first end mounted to the rear section of the mower deck and extending rearwardly and upwardly therefrom in generally parallel, spaced apart relation to a second end having a handgrip attached thereto to be grasped by an operator during operation of the mower.

4. The lawn mower of claim 3 wherein the handle bar assembly includes a pair of lockable brake control thumb latches attached to the handgrips for locking the brake control levers in an actuated position.

5. The lawn mower of claim 3 further comprising an operator control panel mounted between the second ends of the handle bar support tubes.

6. The lawn mower of claim 5 wherein the operator control panel includes a single speed and direction control lever coupled to the hydrostatic drive system for controlling forward and reverse speeds of the mower.

7. A lawn mower comprising:
   a mower deck supporting an engine and having a pair of rear drive wheels mounted thereto;
   a handle bar assembly attached to and extending rearwardly and upwardly from the mower deck for controlling operation of the mower;
   an independent brake assembly mounted to each rear drive wheel for selectively braking the rear drive wheels, each brake assembly is coupled to a brake control lever attached to the handle bar assembly for individually actuating each brake assembly;
   a hydrostatic drive system coupled between the engine and the rear drive wheels for powering the rear drive wheels;
   a linkage mechanism coupled to the brake assemblies and the hydrostatic drive system for releasing hydraulic pressure from the hydrostatic drive system after actuation of at least one of the brake assemblies by the brake control levers to slow rotation of the drive wheels;

wherein the hydrostatic drive system includes a variable hydraulic pump coupled to a fixed displacement hydraulic motor which is coupled to a differential transmission for driving the rear drive wheels;

wherein the linkage mechanism includes a dump valve actuating mechanism coupled to a hydraulic dump valve connected to the hydraulic pump which is actuated by the brake control levers to slow rotation of the rear drive wheels by releasing hydraulic pressure in the hydraulic pump coupled to the hydraulic motor and differential transmission for improved steering and control of the mower; and wherein actuating one of the brake control levers applies a brake to one of the rear drive wheels and actuates the dump valve actuating mechanism which partially opens the hydraulic dump valve to release some of the hydraulic pressure from the hydraulic pump causing the hydraulic motor and differential transmission to slow rotation of the rear drive wheels so that an operator may more easily turn the mower.

8. A lawn mower comprising:

a mower deck supporting an engine and having a pair of rear drive wheels mounted thereto;

a handle bar assembly attached to and extending rearwardly and upwardly from the mower deck for controlling operation of the mower;

an independent brake assembly mounted to each rear drive wheel for selectively braking the rear drive wheels, each brake assembly is coupled to a brake control lever attached to the handle bar assembly for individually actuating each brake assembly;

a hydrostatic drive system coupled between the engine and the rear drive wheels for powering the rear drive wheels;

a linkage mechanism coupled to the brake assemblies and the hydrostatic drive system for releasing hydraulic pressure from the hydrostatic drive system after actuation of at least one of the brake assemblies by the brake control levers to slow rotation of the drive wheels;

wherein the hydrostatic drive system includes a variable hydraulic pump coupled to a fixed displacement hydraulic motor which is coupled to a differential transmission for driving the rear drive wheels;

wherein the linkage mechanism includes a dump valve actuating mechanism coupled to a hydraulic dump valve connected to the hydraulic pump which is actuated by the brake control levers to slow rotation of the rear drive wheels by releasing hydraulic pressure in the hydraulic pump coupled to the hydraulic motor and differential transmission for improved steering and control of the mower; and wherein actuating both brake control levers apply brakes to both rear drive wheels and actuate the dump valve actuating mechanism which fully opens the hydraulic dump valve to release all of the hydraulic pressure from the hydraulic pump causing the hydraulic motor and differential to stop rotation of the rear drive wheels.

9. A lawn mower comprising:

a mower deck supporting an engine and having a pair of rear drive wheels mounted thereto;

a handle bar assembly attached to and extending rearwardly and upwardly from the mower deck for controlling operation of the mower;

an independent brake assembly mounted to each rear drive wheel for selectively braking the rear drive wheels, each brake assembly is coupled to a brake control lever attached to the handle bar assembly for individually actuating each brake assembly;

a hydrostatic drive system coupled between the engine and the rear drive wheels for powering the rear drive wheels;

a linkage mechanism coupled to the brake assemblies and the hydrostatic drive system for releasing hydraulic pressure from the hydrostatic drive system after actuation of at least one of the brake assemblies by the brake control levers to slow rotation of the drive wheels;

wherein the hydrostatic drive system includes a variable hydraulic pump coupled to a fixed displacement hydraulic motor which is coupled to a differential transmission for driving the rear drive wheels;

wherein the linkage mechanism includes a dump valve actuating mechanism coupled to a hydraulic dump valve connected to the hydraulic pump which is actuated by the brake control levers to slow rotation of the rear drive wheels by releasing hydraulic pressure in the hydraulic pump coupled to the hydraulic motor and differential transmission for improved steering and control of the mower; and wherein the linkage mechanism includes a dump valve actuating rod extending through apertures in a brake lever bell crank of each brake assembly, the dump valve actuating rod further extends through a slot in a dump valve actuating cam of the dump valve actuating mechanism.

10. The lawn mower of claim 9 wherein the slot in the dump valve actuating cam has a curved profile so as to accelerate the hydraulic dump valve displacement when partially actuated.

11. The lawn mower of claim 10 wherein the dump valve actuating mechanism includes a dump valve adjustment member connected to the dump valve actuating cam and further connected to a dump valve actuating link, which in turn is pivotally connected to a dump valve actuating arm which extends through a slot in the rear section in the mower deck to the hydraulic dump valve located within the rear section of the mower deck.

12. The lawn mower of claim 11 wherein the dump valve actuating arm rotates about a pivot point on the dump valve actuating link to open the hydraulic dump valve and thereby releasing pressure from the hydraulic pump.

13. The lawn mower of claim 11 wherein the dump valve adjustment member includes an adjustment knob at one end thereof for fine adjustment of the linkage mechanism coupled to the hydraulic dump valve.

14. A self propelled commercial type lawn mower comprising:

a mower deck supporting an engine, a pair of rear drive wheels, and a hydrostatic drive system, wherein the drive system is coupled between the engine and the rear drive wheels;

a handle bar assembly extending rearwardly and upwardly from the mower deck for controlling operation of the mower;

a pair of independent brake assemblies for selectively braking the rear drive wheels, each of the brake assemblies including a brake control lever attached to the handle bar assembly;

a hydrostatic drive system coupled between the engine and the rear drive wheels for powering the rear drive wheels;

a linkage mechanism coupled to the brake assemblies and the hydrostatic drive system for releasing hydraulic pressure from the hydrostatic drive system after actuation of at least one of the brake assemblies to slow rotation of the drive wheels;

wherein the hydrostatic drive system includes a variable hydraulic pump coupled to a fixed displacement hydraulic motor which is coupled to a differential transmission for driving the rear drive wheels; and wherein the linkage mechanism includes a dump valve actuating mechanism coupled to a hydraulic dump valve connected to the hydraulic pump which is actuated by the brake control levers to slow rotation of the rear drive wheels by releasing hydraulic pressure in the hydraulic pump coupled to the hydraulic motor and differential transmission for improved steering and control of the mower.

15. The lawn mower of claim 14 wherein the linkage mechanism further includes a dump valve actuating rod extending through apertures in a brake lever bell crank of each brake assembly, the dump valve actuating rod further extends through a slot having a curved profile in a dump valve actuating cam of the dump valve actuating mechanism.

16. The lawn mower of claim 15 wherein the dump valve actuating mechanism includes a dump valve adjustment member connected to the dump valve actuating cam and further connected to a dump valve actuating link, which in turn is pivotally connected to a dump valve actuating arm which extends through a slot in the mower deck to the hydraulic dump valve located within the rear section of the mower deck.

17. The lawn mower of claim 16 wherein the dump valve actuating arm rotates about a pivot point on the dump valve actuating link to open the hydraulic dump valve and thereby releasing pressure from the hydraulic pump.

18. A self propelled lawn mower comprising:

a mower deck supporting an engine and having a pair of rear drive wheels mounted thereto, the mower deck having a front section housing with a plurality of cutting blades mounted therein and supported by at least one caster wheel, and a rear section supported by the pair of rear drive wheels;

a handle bar assembly attached to and extending from the rear section of the mower deck for steering and controlling the rear drive wheels;

an independent brake assembly mounted to each rear drive wheel for selectively braking the rear drive wheels, each brake assembly is coupled to a brake control lever attached to the handle bar assembly for individually actuating each brake assembly;

a hydrostatic drive system coupled to a linkage mechanism which when activated releases hydraulic pressure in the hydrostatic drive system to slow rotation of the rear drive wheels for improved steering and control of the mower;

wherein the hydrostatic drive system includes a variable hydraulic pump coupled to a fixed displacement hydraulic motor which is coupled to a differential transmission for driving the rear drive wheels; and wherein the linkage mechanism includes a dump valve actuating mechanism coupled to a hydraulic dump valve connected to the hydraulic pump which is actuated by the brake control levers to slow rotation of the rear drive wheels by releasing hydraulic pressure in the hydraulic pump coupled to the hydraulic motor and differential transmission for improved steering and control.

19. The lawn mower of claim 18 wherein the hydraulic dump valve may be partially open by actuating at least one of the brake control levers, so as to partially release hydraulic pressure from the hydraulic pump and thereby reduce rotation of at least one of the rear drive wheels for turning the mower.

20. The lawn mower of claim 18 wherein the linkage mechanism includes a dump valve actuating rod extending through apertures in a brake lever bell crank of each brake assembly, the dump valve actuating rod further extends through a slot in a dump valve actuating cam of the dump valve actuating mechanism.

21. The lawn mower of claim 20 wherein the slot in the dump valve actuating cam has a curved profile so as to accelerate the hydraulic dump valve displacement when partially actuated.

22. The lawn mower of claim 20 wherein the dump valve actuating mechanism includes a dump valve adjustment member connected to the dump valve actuating cam and further connected to a dump valve actuating link, which in turn is pivotally connected to a dump valve actuating arm which extends through a slot in the rear section in the mower deck to the hydraulic dump valve located within rear section of the mower deck.

23. The lawn mower of claim 22 wherein the dump valve actuating arm rotates about a pivot point on the dump valve actuating link to open the hydraulic dump valve and thereby releasing pressure from the hydraulic pump.

24. The lawn mower of claim 22 wherein the dump valve adjustment member includes an adjustment knob at one end thereof for fine adjustment of the linkage mechanism coupled to the hydraulic dump valve.

25. A self propelled commercial type lawn mower comprising:

a mower deck supporting an engine, a pair of rear drive wheels, and a hydrostatic drive system, wherein the drive system is coupled between the engine and the rear drive wheels;

a handle bar assembly extending rearwardly and upwardly from the mower deck for controlling operation of the mower;

a pair of independent brake assemblies for selectively braking the rear drive wheels, each of the brake assemblies including a brake control lever attached to the handle bar assembly;

a hydrostatic drive system coupled between the engine and the rear drive wheels for powering the rear drive wheels;

a linkage mechanism coupled to the brake assemblies and the hydrostatic drive system for releasing hydraulic pressure from the hydrostatic drive system after actuation of at least one of the brake assemblies to slow rotation of the drive wheels;

wherein the hydrostatic drive system includes a variable hydraulic pump coupled to a fixed displacement hydraulic motor which is coupled to a differential transmission for driving the rear drive wheels; and wherein actuation of one of the brake control levers causes the linkage mechanism to partially open a hydraulic dump valve releasing hydraulic pressure from the hydraulic pump to the hydraulic motor and differential transmission to slow rotation of the rear drive wheels for producing smooth, controlled turns.

\* \* \* \* \*